(12) United States Patent
Alcorn

(10) Patent No.: US 10,570,598 B2
(45) Date of Patent: Feb. 25, 2020

(54) ACTUATION APPARATUS

(71) Applicant: A. Shane Alcorn, Sandy, UT (US)

(72) Inventor: A. Shane Alcorn, Sandy, UT (US)

(*) Notice: Subject to any disclaimer, the term of this patent is extended or adjusted under 35 U.S.C. 154(b) by 0 days.

(21) Appl. No.: 16/195,671

(22) Filed: Nov. 19, 2018

(65) Prior Publication Data

US 2019/0127962 A1 May 2, 2019

Related U.S. Application Data

(63) Continuation of application No. 15/011,903, filed on Feb. 1, 2016, now Pat. No. 10,138,624.

(60) Provisional application No. 62/111,711, filed on Feb. 4, 2015.

(51) Int. Cl.
*E03D 1/35* (2006.01)

(52) U.S. Cl.
CPC ..................... *E03D 1/35* (2013.01)

(58) Field of Classification Search
CPC ................... E03D 1/35; E03D 1/34
USPC ............................................. 4/427
See application file for complete search history.

(56) References Cited

U.S. PATENT DOCUMENTS

| | | | | |
|---|---|---|---|---|
| 4,709,427 A * | 12/1987 | Laverty, Jr. | ............... | E03D 3/02 4/427 |
| 9,631,352 B2 * | 4/2017 | Alcorn | ............... | E03D 9/00 |
| 10,138,624 B1 * | 11/2018 | Alcorn | ............... | E03D 1/35 |
| 2005/0071914 A1 * | 4/2005 | Marshall | ............... | E03D 3/00 4/427 |
| 2005/0132483 A1 * | 6/2005 | Butsch | ............... | E03D 1/00 4/427 |
| 2008/0141447 A1 * | 6/2008 | Bowcutt | ............... | E03D 11/00 4/427 |

* cited by examiner

*Primary Examiner* — Huyen D Le
(74) *Attorney, Agent, or Firm* — Kunzler Bean & Adamson

(57) ABSTRACT

The present invention is an actuation apparatus that is adapted such that when a water level sensor senses water at above a predetermined level by means of a float of a float valve "floating" or rising to a predetermined level based on a corresponding increase in a water level, a diaphragm valve "turns on" or repositions such that water is allowed to flow from a pressurized water source to an actuator and the actuator actuates. The apparatus may be used in conjunction with a toilet having auxiliary discharge path and valve in preventing the toilet from overflowing.

20 Claims, 2 Drawing Sheets

ACTUATION APPARATUS

CROSS REFERENCE TO RELATED APPLICATIONS

This US nonprovisional utility patent application claims the benefit under 35 USC § 119(e) of U.S. provisional application No. 62/111,711 filed Feb. 4, 2015 which is expressly incorporated herein in its entirety by this reference.

FIELD OF THE INVENTION

The present invention relates to hydraulic actuation apparatuses and more especially to remotely actuating hydraulic actuation apparatuses that can be used in a toilet or the like to perform work based upon a sensed condition preferably without the use of electricity.

BACKGROUND OF THE INVENTION

Hydraulic actuation apparatuses which actuate and perform predetermined work based upon predetermined conditions are well known. An actuation apparatus is disclosed in U.S. patent application Ser. No. 14/630,378 which is incorporated herein in its entirety. However, such apparatuses typically require electronic sensors or actuators, or function to terminate actuation based on a predetermined water level.

SUMMARY OF THE INVENTION

The present invention is an actuation apparatus that includes a pressurized fluid source such as a pressurized water source, a hydraulic valve, a fluid level sensor, and an actuator. The hydraulic valve preferably defines a diaphragm valve, the fluid level sensor preferably defines a water level sensor in the form of a float valve, and the actuator preferably defines a hydraulic linear cylinder actuator (actuator) or the like. The apparatus is adapted such that when the water level sensor senses water at above a predetermined level by means of the float of the float valve "floating" or rising to a predetermined level based on a corresponding increase in a water level, the diaphragm valve "turns on" or repositions such that water is allowed to flow from the pressurized water source to the actuator and the actuator actuates. The apparatus is further adapted such that when the water level sensor senses water below a predetermined level by means of the float of the float valve "floating" or lowering to a predetermined level based on a corresponding decrease in a water level, the diaphragm valve "turns off" or repositions such that water is prevented from flowing from the pressurized water source to the actuator and the actuator actuates returns to a default position. An exemplary application of the apparatus is the incorporation of the apparatus in a toilet having an auxiliary discharge path such as that disclosed in U.S. provisional application 61/947,117 which is expressly incorporated herein in its entirety by reference.

DESCRIPTION OF DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are included to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In order to facilitate the understanding of the present invention in reviewing the drawings accompanying the specification, a feature list is provided below. It is noted that like features are like numbered throughout all of the figures.

FEATURE TABLE

| # | Feature | # | Feature |
| --- | --- | --- | --- |
| 10 | Actuation apparatus | 12 | Pressurized water supply |
| 14 | Water supply valve | 16 | Water lines |
| 18 | Diaphragm valve | 20 | Float valve |
| 22 | Actuator | | |
| 30 | Actuation apparatus | 32 | Pressurized water supply |
| 34 | Water supply valve | 36 | Water lines |
| 38 | Diaphragm valve | 40 | Float valve |
| 42 | Actuator | 44 | Water dump port |
| 50 | Modular combination valve | 52 | Diaphragm valve |
| 54 | Float valve | 56 | Water lines |

Figure 1:
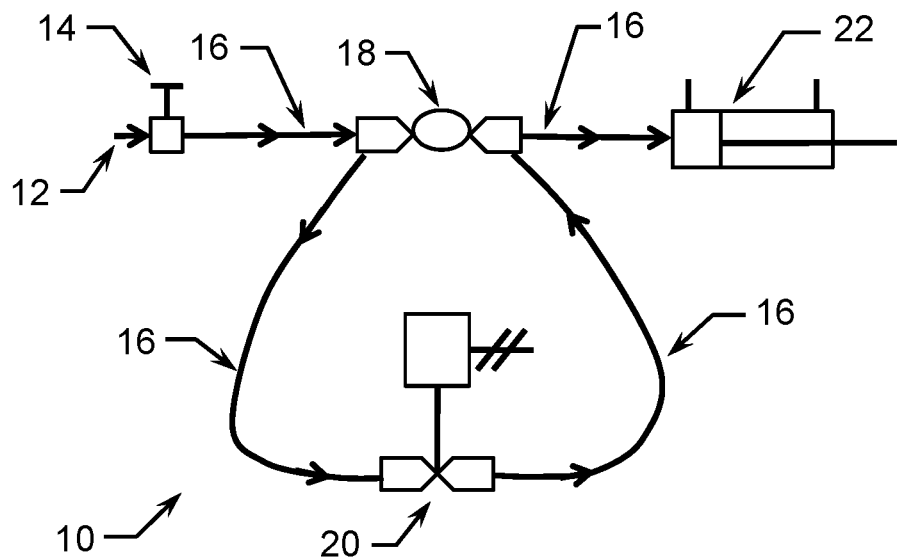
FIG. 1 is a schematic view of the actuation apparatus having a float valve return water line.

Referring now to the drawings and in particular to FIG. 1, a first embodiment of the invention is an actuation apparatus 10 having a pressurized water supply 12 which preferably includes a water supply valve 14, a plurality of water lines 16 (e.g. tubing or pipes) adapted to carry pressurized water, a diaphragm valve 18, a water level sensing float valve 20 (which alternatively may be a diaphragm valve), and an actuator 22 such as an linear cylinder actuator (which may be a single acting actuator or a double acting actuator). Actuation apparatus 10 is preferably configured such that a water line 16 is connected to pressurized water supply on a first end and to a first port of the diaphragm valve on a second end, a water line 16 is connected to a second port of diaphragm valve 18 on a first end and to a first port of float valve 20 on a second end, a water line 16 is connected to a second port of float valve 20 on a first end and to a third port of diaphragm valve 18 on a second end, and a water line 16 is connected to a fourth port of diaphragm valve 18 on a first end and to a first port of actuator 22 on a second end. It is noted that diaphragm valve 18, float valve 20, and actuator 22 may be arranged in close proximity to each other or in substantial distance from one another. For instance, apparatus 10 may be configured such that float valve 20 senses a water level that is substantially remotely located from diaphragm valve 18.

In a first embodiment in practice, actuation apparatus 10 is adapted such that when water supply valve 14 is opened, pressurized water 12 is supplied to float valve 20 via diaphragm valve 18. In a nominal or default position when the float of float valve 20 is below a predetermined level, float valve 20 remains closed. However, when water rises above a predetermined level causing the float of float valve 20 to rise above a predetermined level, float valve 20 opens and remains open while the float of float valve 20 remains above a predetermined level. Opening of float valve 20 causes pressurized water 12 to flow to diaphragm valve 18, which in turn causes pressurized water 12 to flow from diaphragm valve 18 to actuator 22. Pressurized water 12 flowing to actuator 22 causes actuator 22 to actuate and perform work. Upon closing of float valve 20, pressurized water 12 ceases to flow from float valve 20 to diaphragm valve 18 and from diaphragm valve 18 to actuator 22, and actuator 22 returns to a nominal or unactuated position.

Figure 2:
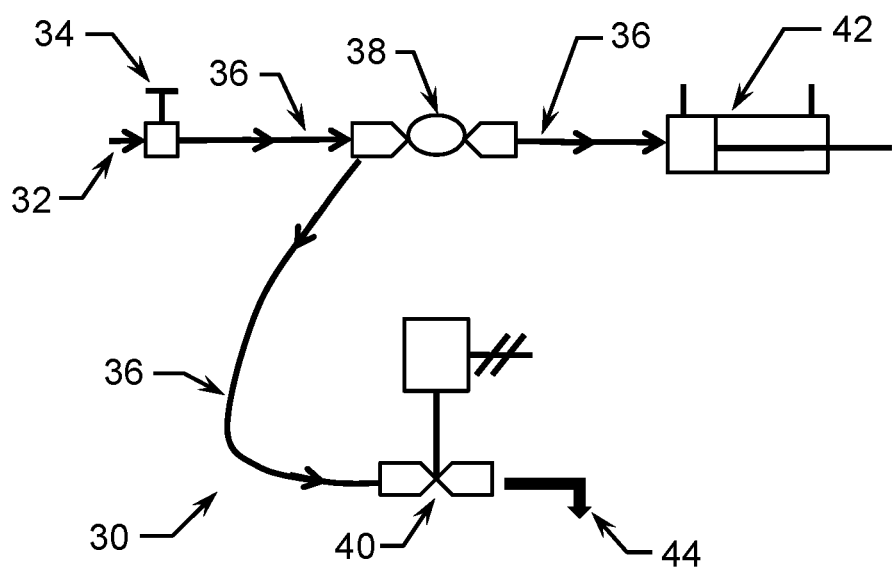
FIG. 2 is a schematic view of the actuation apparatus having a float valve water dump line.

Referring now to the drawings and in particular to FIG. 2, a second embodiment of the invention is an actuation apparatus 30 having a pressurized water supply 32 which preferably includes a water supply valve 34, a plurality of water lines 36 (e.g. tubing or pipes) adapted to carry pressurized water, a diaphragm valve 38, a water level sensing float valve 40 (which alternatively may be a diaphragm valve), an actuator 42 such as an linear cylinder actuator (which may be a single acting actuator or a double acting actuator), and a water dump port 44. Actuation apparatus 30 is preferably configured such that a water line 36 is connected to pressurized water supply 32 on a first end and to a first port of diaphragm valve 38 on a second end, a water line 36 is connected to a second port of diaphragm valve 38 on a first end and to a first port of float valve 40 on a second end, a water line 36 is connected to a second port of float valve 40 on a first end and to water dump port 44 on a second end, and a water line 36 is connected to a third port of diaphragm valve 38 on a first end and to a first port of actuator 42 on a second end. It is noted that diaphragm valve 38, float valve 40, and actuator 42 may be arranged in close proximity to each other or in substantial distance from one another. For instance, apparatus 30 may be configured such that float valve 40 senses a water level that is substantially remotely located from the diaphragm valve 38.

In a second embodiment in practice, actuation apparatus 30 is adapted such that when water supply valve 34 is opened, pressurized water 32 is supplied to float valve 40 via diaphragm valve 38. In a nominal or default position when the float of float valve 40 is below a predetermined level, float valve 40 remains closed. However, when water rises above a predetermined level causing the float of float valve 40 to rise above a predetermined level, float valve 40 opens and remains open while the float of float valve 40 remains above a predetermined level. Opening of float valve 40 causes pressurized water 32 to flow from diaphragm valve 38 to actuator 42 and a minimal amount of water 32 to flow to water dump port 44. Pressurized water 32 flowing to actuator 42 causes actuator 42 to actuate and perform work.

Upon closing of float valve 40, pressurized water 32 ceases to flow from diaphragm valve 38 to actuator 42, and actuator 42 returns to a nominal or unactuated position, and water ceases to flow to water dump port 44.

Figure 3:
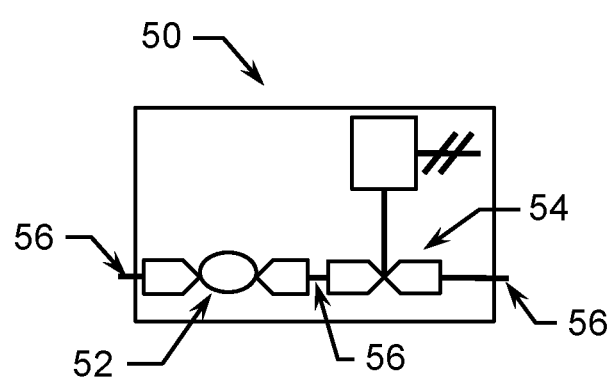
FIG. 3 is a schematic view of a modular combination float valve and diaphragm valve.

Referring now to the drawings and in particular to FIG. 3, an optional modular combination valve 50 having a diaphragm valve 52, a float valve 54, and a plurality of water lines 56 (e.g. tubing or pipes) adapted to carry pressurized water is disclosed. For original installation as well as maintenance, modular combination valve 50 is adapted such that modular combination valve 50 may be installed in an actuation apparatus and replaced in an actuation apparatus as a single combination of both a diaphragm valve and a float valve.

In an exemplary application of the actuation apparatus, the apparatus is positioned with and adapted for use in actuating a toilet having an auxiliary discharge path such as that disclosed in U.S. patent application Ser. No. 14/630,378. For instance, actuation apparatus 10 (or optionally actuation apparatus 30) is adapted to toilet apparatus 30 of the Ser. No. 14/630,378 application as follows. Float valve 20 is positioned in a cavity of toilet apparatus 30 of '378, preferably behind toilet bowl 32 of '378, wherein the cavity of '378 is subject to filling and draining of water substantially corresponding to the filling and draining of toilet bowl 32 of '378 with liquid (e.g. the fluid levels of both bowl 32 of '378 and the cavity of '378 correspond substantially equally and substantially rise and fall together). Further, diaphragm valve 18 is positioned at a location of functional convenience within toilet apparatus 30 of '378 and actuator 22 forms actuator 44 of '378 of auxiliary discharge valve 42 of '378. In practice, with pressurized water available to float valve 20 and diaphragm valve 18, float valve 20 remains closed absent the rise of the float of float valve 20 above a predetermined level. However, when fluid rises in bowl 32 of '378 above a predetermined level (but preferably below a level that would cause overflow of bowl 32 of '378), fluid correspondingly rises above a predetermined level in the cavity of '378 causing the float of float valve 20 to rise above a predetermined level. Rising of the float of float valve 20 above a predetermined level causes float valve 20 to open and pressurized water to flow from diaphragm valve 18 to actuator 22, causing actuator 22 to actuate. Actuation of actuator 22 causes auxiliary discharge valve 42 of '378 to open allowing contents of bowl 32 of '378 to be emptied directly to sewer line 48 of '378. Upon the lowering of the fluid level in bowl 32 of '378 to below a predetermined level, fluid in the cavity of '378 lowers a corresponding amount causing the float of float valve 20 to lower below a predetermined amount. Lowering of float of float valve 20 to lower than a predetermined amount causes float valve 20 to close, causing water to cease to flow from float valve 20 and diaphragm valve 18 and causing actuator 22 to return to a nominal position and to close auxiliary discharge valve 42 of '378. By actuation apparatus 10 being thus adapted to toilet apparatus 30 of '378, not only is toilet apparatus 30 of '378 prevented from overflowing, but toilet apparatus 30 of '378 is prevented from overflowing without the use of any electronics (e.g. electronic sensors or actuators), and thus not only avoids electrical power consumption but provides for a more reliable toilet apparatus than would otherwise be available. Rather than separate stand-alone valves, in toilet apparatus 30 of '378 which incorporates actuation apparatus 10, float valve 20 and diaphragm valve 18 are preferably provided as modular combination valve 50 incorporating both a diaphragm valve and a float valve.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An actuation apparatus, comprising:
a diaphragm valve, having an upstream side and a downstream side, opposite the upstream side;
a hydraulic actuator, fluidly coupled with the downstream side of the diaphragm valve by a first hydraulic line; and
a float valve fluid level sensor that comprises a float and is fluidly coupled with the upstream side of the diaphragm valve by a second hydraulic line;
wherein:
the float valve fluid level sensor is configured to open when the float rises above a predetermined level;
pressurized fluid from the downstream side of the diaphragm valve flows to the hydraulic actuator, via the first hydraulic line, in response to opening of the float valve fluid level sensor; and
the hydraulic actuator is configured to actuate in response to receipt of pressurized fluid from the downstream side of the diaphragm valve.

2. The actuation apparatus according to claim 1, wherein the float valve fluid level sensor is spatially remote from the diaphragm valve.

3. The actuation apparatus according to claim 1, wherein the float valve fluid level sensor is spatially remote from the diaphragm valve by a distance corresponding with a length of the second hydraulic line.

4. The actuation apparatus according to claim 1, further comprising a pressurized fluid supply, fluidly coupled with the upstream side of the diaphragm valve by a third hydraulic line to supply pressurized fluid to the upstream side of the diaphragm valve, wherein pressurized fluid from the upstream side of the diaphragm valve is supplied to the float valve fluid level sensor via the second hydraulic line.

5. The actuation apparatus according to claim 4, wherein pressurized fluid from the float valve fluid level sensor is supplied to the downstream side of the diaphragm valve, via a fourth hydraulic line, when the float valve fluid level sensor is open.

6. The actuation apparatus according to claim 4, further comprising a dump port fluidly coupled with the float valve fluid level sensor, wherein the float valve fluid level sensor is configured to supply a portion of pressurized fluid received from the diaphragm valve to the dump port when the float valve fluid level sensor is open.

7. The actuation apparatus according to claim 4, wherein the diaphragm valve supplies pressurized fluid to the hydraulic actuator only by non-mechanical hydraulic actuation of the diaphragm valve by pressurized fluid from the pressurized fluid supply.

8. The actuation apparatus according to claim 1, wherein the diaphragm valve supplies pressurized fluid to the hydraulic actuator only by non-mechanical hydraulic actuation of the diaphragm valve caused by pressurized fluid passing through the float valve fluid level sensor.

9. The actuation apparatus according to claim 1, wherein:
the float valve fluid level sensor is fluidly coupleable to a non-pressurized fluid supply; and
the float of the float valve fluid level sensor rises in response to a rise in the non-pressurized fluid supply.

10. The actuation apparatus according to claim 1, wherein the float valve fluid level sensor is a non-electric passive sensor.

11. The actuation apparatus according to claim 1, wherein the float valve fluid level sensor is non-electrically coupled with the diaphragm valve.

12. An actuation apparatus, comprising:
a diaphragm valve, having an upstream side and a downstream side, opposite the upstream side;
a hydraulic actuator, fluidly coupled with the downstream side of the diaphragm valve by a first hydraulic line; and
a fluid level sensor, fluidly coupled with the upstream side of the diaphragm valve by a second hydraulic line;
wherein:
the fluid level sensor is configured to open when a threshold level of fluid is sensed by fluid level sensor;
pressurized fluid from the downstream side of the diaphragm valve flows to the hydraulic actuator, via the first hydraulic line, in response to opening of the fluid level sensor;
the hydraulic actuator is configured to actuate in response to receipt of pressurized fluid from the downstream side of the diaphragm valve; and
the diaphragm valve, the hydraulic actuator, and the fluid level sensor are exclusively fluid-powered and non-electric.

13. The actuation apparatus according to claim 12, wherein the fluid level sensor is spatially remote from the diaphragm valve.

14. The actuation apparatus according to claim 12, wherein the fluid level sensor is spatially remote from the diaphragm valve by a distance corresponding with a length of the second hydraulic line.

15. The actuation apparatus according to claim 12, further comprising a pressurized fluid supply, fluidly coupled with the upstream side of the diaphragm valve by a third hydraulic line to supply pressurized fluid to the upstream side of the diaphragm valve, wherein pressurized fluid from the upstream side of the diaphragm valve is supplied to the fluid level sensor via the second hydraulic line.

16. The actuation apparatus according to claim 15, wherein pressurized fluid from the fluid level sensor is supplied to the downstream side of diaphragm valve, via a fourth hydraulic line, when the fluid level sensor is open.

17. The actuation apparatus according to claim 15, further comprising a dump port fluidly coupled with the fluid level sensor, wherein the fluid level sensor is configured to supply a portion of pressurized fluid received from the diaphragm valve to the dump port when the fluid level sensor is open.

18. The actuation apparatus according to claim 15, wherein the diaphragm valve supplies pressurized fluid to the hydraulic actuator only by non-mechanical hydraulic actuation of the diaphragm valve by pressurized fluid from the pressurized fluid supply.

19. The actuation apparatus according to claim 15, wherein the diaphragm valve supplies pressurized fluid to the hydraulic actuator only by non-mechanical hydraulic actuation of the diaphragm valve caused by pressurized fluid passing through the fluid level sensor.

20. The actuation apparatus according to claim 12, wherein:
the fluid level sensor is fluidly coupleable to a non-pressurized fluid supply; and the fluid level sensor opens in response to a rise in the non-pressurized fluid supply.

\* \* \* \* \*